United States Patent
Yoon et al.

(10) Patent No.: US 9,422,197 B2
(45) Date of Patent: Aug. 23, 2016

(54) DIELECTRIC CERAMIC COMPOSITION, DIELECTRIC MATERIAL AND MULTILAYER CERAMIC CAPACITOR INCLUDING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Yun Jung Park, Suwon-Si (KR); Doo Young Kim, Suwon-Si (KR); Song Je Jeon, Suwon-Si (KR); Chang Hoon Kim, Suwon-Si (KR)

(73) Assignee: SAMUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/678,519

(22) Filed: Apr. 3, 2015

(65) Prior Publication Data

US 2016/0194248 A1    Jul. 7, 2016

(30) Foreign Application Priority Data

Jan. 5, 2015    (KR) .................. 10-2015-0000777

(51) Int. Cl.
| | | |
|---|---|---|
| *C04B 35/468* | (2006.01) | |
| *H01G 4/12* | (2006.01) | |
| *H01G 4/30* | (2006.01) | |
| *H01G 4/224* | (2006.01) | |

(52) U.S. Cl.
CPC .......... *C04B 35/4682* (2013.01); *H01G 4/1227* (2013.01); *H01G 4/224* (2013.01); *H01G 4/30* (2013.01)

(58) Field of Classification Search
CPC .......................... C04B 35/4682; H01G 4/1227
See application file for complete search history.

(56) References Cited

U.S. PATENT DOCUMENTS

| | | | | |
|---|---|---|---|---|
| 6,599,855 | B2 * | 7/2003 | Naito | C04B 35/462 333/167 |
| 6,703,336 | B2 * | 3/2004 | Fukuda | C03C 8/14 501/138 |
| 6,842,329 | B2 * | 1/2005 | Feltz | H01G 4/1227 361/311 |
| 2004/0176238 | A1 | 9/2004 | Ito et al. | |
| 2007/0142209 | A1 * | 6/2007 | Ito | B32B 18/00 501/137 |
| 2007/0284792 | A1 * | 12/2007 | Yanagida | B82Y 30/00 264/614 |
| 2015/0299048 | A1 * | 10/2015 | Yoon | C04B 35/4682 361/301.4 |

FOREIGN PATENT DOCUMENTS

| | | | |
|---|---|---|---|
| JP | 2011-029583 A | | 2/2011 |
| JP | 2011155124 | * | 8/2011 |
| KR | 1999-0075846 A | | 10/1999 |
| KR | 10-2004-0030669 A | | 4/2004 |

* cited by examiner

*Primary Examiner* — Karl Group
(74) *Attorney, Agent, or Firm* — McDermott Will & Emery LLP

(57) ABSTRACT

There is provided a dielectric ceramic composition including: a major component (a barium titanate-based base material); and a minor component, wherein in an XRD analysis of a sintered body obtained by sintering the dielectric ceramic composition, when a (110) peak of $BaTiO_3$ is set as 1.00, a ratio of a peak of pyrochlore ($RE_2Ti_2O_7$) at about 30.5 degrees with respect to the (110) peak of $BaTiO_3$ satisfies 0.02 or less, where RE is at least one of Y, Dy, Ho, Sm, Gd, Er, La, Ce, Nd, Tb, and Pr.

19 Claims, 3 Drawing Sheets

DIELECTRIC CERAMIC COMPOSITION, DIELECTRIC MATERIAL AND MULTILAYER CERAMIC CAPACITOR INCLUDING THE SAME

CROSS-REFERENCE TO RELATED APPLICATION

This application claims the priority and benefit of Korean Patent Application No. 10-2015-0000777 filed on Jan. 5, 2015, with the Korean Intellectual Property Office, the disclosure of which is incorporated herein by reference.

BACKGROUND

The present disclosure relates to a dielectric ceramic composition having guaranteed X8R temperature characteristics and reliability, a dielectric material, and a multilayer ceramic capacitor including the same.

Electronic components using ceramic materials, such as capacitors, inductors, piezoelectric elements, varistors, and thermistors, include a ceramic body formed of ceramic materials, internal electrodes formed in the ceramic body, and external electrodes formed on a surface of the ceramic body to be connected to the internal electrodes.

Among ceramic electronic components, multilayer ceramic capacitors include a plurality of stacked dielectric layers, internal electrodes disposed to face each other, having at least one of the dielectric layers interposed therebetween, and external electrodes electrically connected to the internal electrodes.

Multilayer ceramic capacitors are generally manufactured by printing a paste for internal electrodes on sheets formed of a paste for dielectric layers, stacking the sheets and sintering the same.

Dielectric materials used in existing multilayer ceramic capacitors having high capacitance, and the like, are commonly barium titanate ($BaTiO_3$)-based ferroelectric materials which have high dielectric constants at room temperature, a relatively low dissipation factor, and excellent insulation resistance properties.

However, the use of such barium titanate ($BaTiO_3$)-based ferroelectric materials may be problematic in terms of satisfying X8R characteristics and obtaining guaranteed reliability.

RELATED ART DOCUMENT (Patent Document 1) Korean Patent Laid-Open Publication No. 1999-0075846

SUMMARY

An aspect of the present disclosure may provide a novel dielectric ceramic composition having guaranteed X8R temperature characteristics and reliability, a dielectric material, and a multilayer ceramic capacitor including the same.

According to an aspect of the present disclosure, there are provided a dielectric ceramic composition including: a major component (a barium titanate-based base material); and a minor component, wherein in an XRD analysis of a sintered body obtained by sintering the dielectric ceramic composition, when a (110) peak of $BaTiO_3$ is set as 1.00, a ratio of a peak of pyrochlore ($RE_2Ti_2O_7$) at about 30.5 degrees with respect to the (110) peak of $BaTiO_3$ satisfies 0.02 or less, where RE is at least one of Y, Dy, Ho, Sm, Gd, Er, La, Ce, Nd, Tb, and Pr, and a dielectric material obtained by sintering the dielectric ceramic composition.

According to another aspect of the present disclosure, a multilayer ceramic capacitor may include: a ceramic body in which dielectric layers and internal electrodes are alternately stacked; and external electrodes provided on external surfaces of the ceramic body and electrically connected to the internal electrodes, wherein in an XRD analysis of the dielectric layer, when a (110) peak of $BaTiO_3$ is set as 1.00, a ratio of a peak of pyrochlore ($RE_2Ti_2O_7$) at about 30.5 degrees with respect to the (110) peak of $BaTiO_3$ satisfies 0.02 or less, where RE is at least one of Y, Dy, Ho, Sm, Gd, Er, La, Ce, Nd, Tb, and Pr.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

The present inventive concept relates to a dielectric ceramic composition, and examples of electronic components including the dielectric ceramic composition include capacitors, inductors, piezoelectric elements, varistors, and thermistors. Hereinafter, a dielectric ceramic composition and a multilayer ceramic capacitor including the same as an example of the electronic components will be described in exemplary embodiments.

A dielectric ceramic composition according to exemplary embodiments may include: a major component (a base material); and a minor component, wherein the major component is a barium titanate-based compound including Ba and Ti.

In an XRD analysis of a sintered body obtained by sintering the dielectric ceramic composition according to exemplary embodiments, when a (110) peak of $BaTiO_3$ is set as 1.00, a ratio of a peak of a pyrochlore ($RE_2Ti_2O_7$) at an angle of diffraction (2θ) of about 30.5 degrees with respect to the (110) peak of $BaTiO_3$ may satisfy 0.02 or less, where RE is at least one of Y, Dy, Ho, Sm, Gd, Er, La, Ce, Nd, Tb, and Pr.

The dielectric ceramic composition according to exemplary embodiments may satisfy X5R (−55° C. to 85° C.), X7R (−55° C. to 125° C.), and X8R (−55° C. to 150° C.) characteristics defined by the Electronic Industries Association (EIA) standard.

In addition, by adjusting relative intensity of the pyrochlore phase in an XRD analysis, a dielectric ceramic composition, a dielectric material, and a multilayer ceramic capacitor including the same, may obtain excellent reliability.

According to exemplary embodiments, nickel (Ni) may be used as internal electrodes and a dielectric ceramic composition may be sintered under a reducing atmosphere in which nickel (Ni) is not oxidized, at a temperature of 1300° C. or lower.

In addition, according to exemplary embodiments, a dielectric material may be formed by sintering the dielectric ceramic composition, and a multilayer ceramic capacitor may be formed using the dielectric ceramic composition.

The multilayer ceramic capacitor according to exemplary embodiments may satisfy the above-described temperature characteristics and may have excellent reliability.

Figure 1:
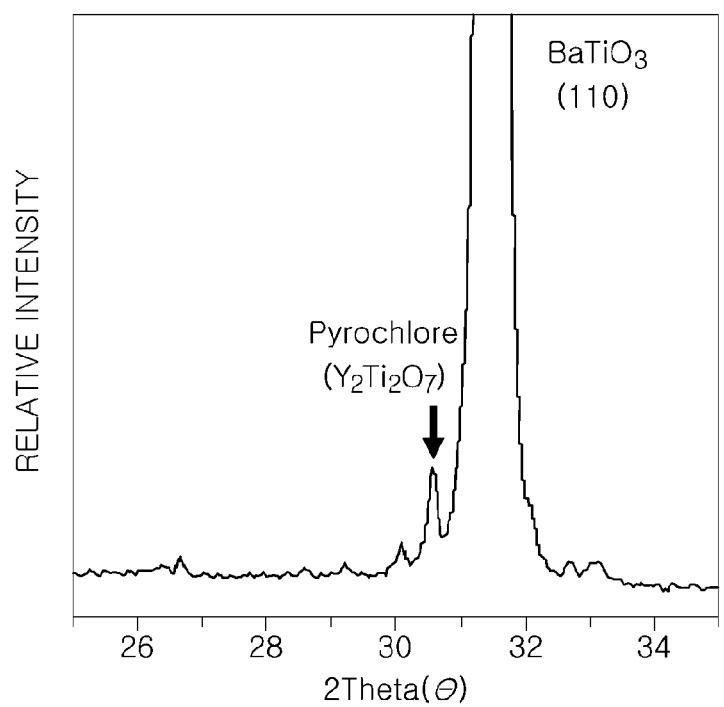
FIG. 1 is an X-ray diffraction (XRD) graph after sintering a dielectric ceramic composition according to an exemplary embodiment in the present disclosure.

FIG. 1 is an X-ray diffraction (XRD) graph after sintering a dielectric ceramic composition according to an exemplary embodiment in the present disclosure.

Referring to FIG. 1, in an XRD analysis of the sintered body according to the exemplary embodiment, when a (110) peak of $BaTiO_3$ is set as 1.00, a ratio of a peak of a pyrochlore phase ($RE_2Ti_2O_7$) at about 30.5 degrees with respect to the (110) peak of $BaTiO_3$ may satisfy 0.02 or less, where RE is at least one of Y, Dy, Ho, Sm, Gd, Er, La, Ce, Nd, Tb, and Pr.

Figure 2:
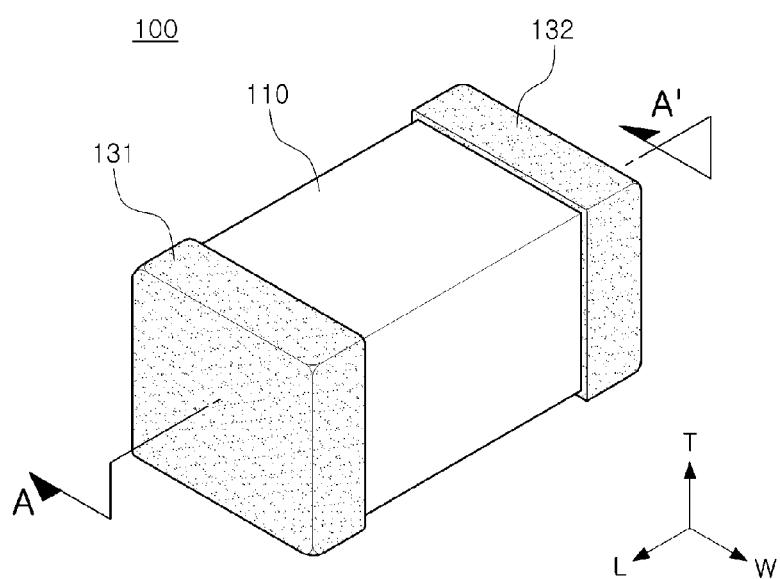
FIG. 2 is a schematic perspective view of a multilayer ceramic capacitor according to another exemplary embodiment in the present disclosure.

In particular, referring to FIG. 2, the pyrochlore phase may be $Y_2Ti_2O_7$.

When $CaZrO_3$ and an excessive amount of rare-earth element are added to $BaTiO_3$ in order to satisfy high temperature characteristics (X8R characteristics), the high temperature characteristics may be satisfactory; however, since a Curie temperature of the major component itself is 125° C., there may be limitations in improving temperature coefficient of capacitance (TCC) characteristics at high temperatures.

Further, the pyrochlore phase is formed by adding the excessive amount of rare-earth element, resulting in deterioration of reliability.

However, according to exemplary embodiments, the high temperature characteristics (X8R characteristics) and the TCC characteristics at high temperatures may be satisfactory.

Further, the ratio of the peak of the pyrochlore phase to the peak of $BaTiO_3$ may be adjusted and reliability may be guaranteed by adjusting the content of the rare-earth element.

In addition, TCC at a high temperature may be improved and X8R characteristics may be achieved by adjusting the Mg content.

Therefore, a multilayer ceramic capacitor to which the dielectric ceramic composition according to the exemplary embodiment is applied, may satisfy high temperature characteristics (X8R characteristics) and have excellent TCC characteristics at high temperatures.

In addition, by adjusting a (Ba+Ca)/Si ratio of the minor components in order to obtain appropriate permittivity and sinterability, the permittivity and sinterability may be appropriately obtained and the high temperature characteristics (X8R characteristics) may be satisfactory.

The dielectric ceramic composition according to the exemplary embodiment may include the major component and the minor component, and the minor component may include first to sixth minor components.

Hereinafter, each component of the dielectric ceramic composition according to exemplary embodiments will be described in detail.

a) Major Component (Base Material)

The dielectric ceramic composition according to exemplary embodiments may include a major component (a base material) including Ba and Ti.

According to exemplary embodiments, the major component may include at least one selected from the group consisting of $BaTiO_3$, $(Ba_{1-x}Ca_x)(Ti_{1-y}Ca_y)O_3$ ($0 \leq x \leq 0.3$ and $0 \leq y \leq 0.1$), $(Ba_{1-x}Ca_x)(Ti_{1-y}Zr_y)O_3$ ($0 \leq x \leq 0.3$ and $0 \leq y \leq 0.5$), and $Ba(Ti_{1-y}Zr_y)O_3$ ($0 \leq y \leq 0.5$), but the major component is not limited thereto, and a solid-solution base powder modified from barium titanate may be used.

An average grain size of the base powder may be 1000 nm or less, but is not limited thereto.

b) First Minor Component

According to exemplary embodiments, the dielectric ceramic composition may include at least one selected from the group consisting of oxides and carbonates of at least one of Mn, V, Cr, Fe, Ni, Co, Cu, and Zn, as a first minor component.

The first minor component may have a content of 0.2 to 2.0 parts by mol on the basis of 100 parts by mol of the major component (the base material).

The content of the first minor component may be determined on the basis of a content of at least one of Mn, V, Cr, Fe, Ni, Co, Cu and Zn included in the first minor component, regardless of the oxide or carbonate form of the corresponding element.

For example, at least one of variable-valence acceptor elements of Mn, V, Cr, Fe, Ni, Co, Cu, and Zn included in the first minor component may have a total content of 0.2 to 2.0 parts by mol on the basis of 100 parts by mol of the major component.

The content of the first minor component and each content of second to fourth minor components and a sixth minor component to be described below may be a relative amount on the basis of 100 parts by mol of the major component, in particular, may be defined as parts by mol of a metal or a semi-metal (Si) included in each minor component. The parts by mol of the metal or the semi-metal may include parts by mol of the metal or the semi-metal in an ionic state.

When the content of the first minor component is 0.2 to 2.0 parts by mol on the basis of 100 parts by mol of the major component, non-reducibility may be achieved to provide the dielectric ceramic composition having guaranteed RC values and excellent high temperature withstand voltage characteristics.

When the content of the first minor component is less than 0.2 parts by mol, the RC value may be significantly low or the high temperature withstand voltage may be decreased.

When the content of the first minor component exceeds 2.0 parts by mol, the RC value may be decreased.

c) Second Minor Component

According to exemplary embodiments, the dielectric ceramic composition may include at least one selected from the group consisting of oxides and carbonates of a fixed-valence acceptor element including Mg, as a second minor component.

The second minor component may have a content of 0.5 parts by mol or less on the basis of 100 parts by mol of the major component (the base material).

The content of the second minor component may be determined on the basis of a content of Mg included in the second minor component, regardless of the oxide or carbonate form of the corresponding element, Mg.

For example, the content of Mg included in the second minor component may be 0.5 parts by mol or less on the basis of 100 parts by mol of the major component.

When the content of the second minor component exceeds 0.5 parts by mol on the basis of 100 parts by mol of the major component of the dielectric ceramic composition, the composition may deviate from the X8R characteristics.

d) Third Minor Component

According to exemplary embodiments, the dielectric ceramic composition may include at least one selected from the group consisting of oxides and carbonates of at least one of Y, Dy, Ho, Sm, Gd, Er, La, Ce, Nd, Tb, and Pr, as a third minor component.

The third minor component may have a content of 0.2 to 5.0 parts by mol on the basis of 100 parts by mol of the major component.

The content of the third minor component may be determined on the basis of a content of at least one of Y, Dy, Ho, Sm, Gd, Er, La, Ce, Nd, Tb, and Pr included in the third minor component, regardless of the oxide or carbonate form of the corresponding element.

For example, at least one of Y, Dy, Ho, Sm, Gd, Er, La, Ce, Nd, Tb, and Pr included in the third minor component may have a total content of 0.2 to 5.0 parts by mol on the basis of 100 parts by mol of the major component.

The third minor component may serve to prevent deterioration in reliability of a multilayer ceramic capacitor to which the dielectric ceramic composition is applied.

In detail, in an XRD analysis of the sintered body obtained by sintering the dielectric ceramic composition in which the content of the third minor component is adjusted, when a (110) plane peak of a $BaTiO_3$ crystal phase is set as 1.00, a ratio of a peak of a pyrochlore phase ($RE_2Ti_2O_7$) at about 30.5 degrees with respect to the peak of the $BaTiO_3$ crystal phase may satisfy 0.02 or less, where RE is at least one of Y, Dy, Ho, Sm, Gd, Er, La, Ce, Nd, Tb, and Pr.

When the content of the third minor component is less than 0.2 parts by mol on the basis of 100 parts by mol of the major component, the improvement of TCC at high temperatures may be insignificant, and when the content of the third minor component exceeds 5.0 parts by mol on the basis of 100 parts by mol of the major component, the high temperature withstand voltage characteristics may deteriorate due to the formation of the pyrochlore phase ($RE_2Ti_2O_7$) (wherein RE is at least one of Y, Dy, Ho, Sm, Gd, Er, La, Ce, Nd, Tb, and Pr).

e) Fourth Minor Component

According to exemplary embodiments, the dielectric ceramic composition may include $CaZrO_3$ as a fourth minor component.

The content of $CaZrO_3$ may be 0.25 to 5.0 parts by mol on the basis of 100 parts by mol of the major component.

When the content of $CaZrO_3$ is less than 0.25 parts by mol or is more than 5.0 parts by mol on the basis of 100 parts by mol of the major component, TCC at high temperatures may not satisfy the X8R characteristics.

f) Fifth Minor Component

According to exemplary embodiments, the dielectric ceramic composition may include at least one selected from the group consisting of oxides and carbonates of at least one of Ba and Ca, as a fifth minor component.

The fifth minor component may have a content of 0.72 to 7.68 parts by mol on the basis of 100 parts by mol of the major component.

The content of the fifth minor component may be determined on the basis of a content of at least one of Ba and Ca included in the fifth minor component, regardless of the oxide or carbonate form of the corresponding element.

For example, at least one of Ba and Ca included in the fifth minor component may have a total content of 0.72 to 7.68 parts by mol on the basis of 100 parts by mol of the major component.

When the content of the fifth minor component is 0.72 to 7.68 parts by mol on the basis of 100 parts by mol of the major component, a dielectric constant and high temperature withstand voltage characteristics may be improved.

g) Sixth Minor Component

According to exemplary embodiments, the dielectric ceramic composition may include at least one selected from the group consisting of oxides and carbonates of Si, and glass including Si, as a sixth minor component.

The sixth minor component may have a content of 0.5 to 3.0 parts by mol on the basis of 100 parts by mol of the major component.

The content of the sixth minor component may be determined on the basis of the content of Si included in the sixth minor component, regardless of the glass, oxide, or carbonate form of the corresponding element, Si.

When the content of the sixth minor component is less than 0.5 parts by mol on the basis of 100 parts by mol of the major component, permittivity and high temperature withstand voltage characteristics may deteriorate, and when the content of the sixth minor component exceeds 3.0 parts by mol on the basis of 100 parts by mol of the major component, problems such as deterioration in sinterability and density, the formation of a secondary phase, may occur.

Figure 3:
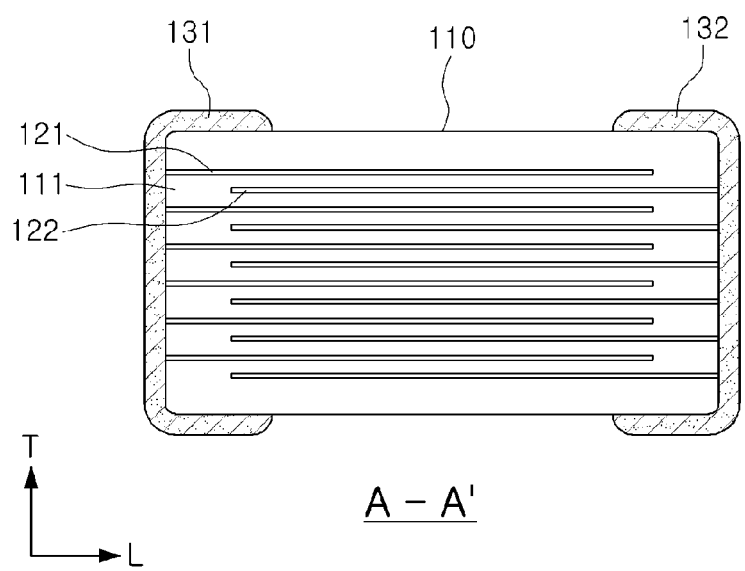
FIG. 3 is a schematic cross-sectional view of the multilayer ceramic capacitor taken along line A-A' of FIG. 2.

FIG. 2 is a schematic perspective view of a multilayer ceramic capacitor according to another exemplary embodiment in the present disclosure; and FIG. 3 is a schematic cross-sectional view of the multilayer ceramic capacitor taken along line A-A' of FIG. 2.

Referring to FIGS. 2 and 3, a multilayer ceramic capacitor 100 according to another exemplary embodiment may have a ceramic body 110 in which dielectric layers 111 and internal electrodes 121 and 122 are alternately stacked. First and second external electrodes 131 and 132 may be formed on both end portions of the ceramic body 110 to be electrically connected to the first and second internal electrodes 121 and 122, respectively.

The ceramic body 110 may generally have a hexahedral shape, but is not limited thereto. In addition, the ceramic body 110 may have a size appropriate for the intended use thereof, for example, (0.6 mm to 5.6 mm)×(0.3 mm to 5.0 mm)×(0.3 mm to 1.9 mm), but the size of the ceramic body 110 is not limited thereto.

Further, a thickness of the dielectric layer 111 may be changed depending on target capacitance of the capacitor. According to exemplary embodiments, a single dielectric layer may have a thickness of 0.1 μm or more after being sintered.

In a case in which the dielectric layers are excessively thin, a small number of crystal grains are present in a single dielectric layer, which brings a negative effect on reliability. Therefore, each of the dielectric layers may have a thickness of 0.1 μm or more.

The first and second internal electrodes 121 and 122 may be stacked while allowing end portions thereof to be exposed to both end surfaces of the ceramic body 110.

The first and second external electrodes 131 and 132 may be formed on both end portions of the ceramic body 110 and be electrically connected to the exposed end portions of the first and second internal electrodes 121 and 122, thereby configuring a circuit of the capacitor.

A conductive material contained in the first and second internal electrodes 121 and 122 may be nickel (Ni), but is not limited thereto.

A thickness of each of the first and second internal electrodes 121 and 122 may be appropriately determined depending on the use thereof, or the like, for example, 0.1 μm to 5 μm or 0.1 μm to 2.5 μm, but is not limited thereto.

A conductive material contained in the first and second external electrodes 131 and 132 may be nickel (Ni), copper (Cu), or alloys thereof, but is not limited thereto.

The dielectric layers 111 forming the ceramic body 110 may include a dielectric ceramic composition according to exemplary embodiments.

The dielectric layers 111 forming the ceramic body 110 may be formed by sintering a dielectric ceramic composition according to exemplary embodiments.

In an XRD analysis of the sintered body obtained by sintering the dielectric ceramic composition, when a (110) peak of $BaTiO_3$ is set as 1.00, a ratio of a peak of pyrochlore ($RE_2Ti_2O_7$) at about 30.5 degrees with respect to the (110) peak of $BaTiO_3$ may satisfy 0.02 or less, where RE is at least one of Y, Dy, Ho, Sm, Gd, Er, La, Ce, Nd, Tb, and Pr.

In an XRD analysis of the dielectric layer according to exemplary embodiments, when a (110) peak of $BaTiO_3$ is set as 1.00, a ratio of a peak of a pyrochlore phase ($RE_2Ti_2O_7$) at about 30.5 degrees with respect to the peak of $BaTiO_3$ may satisfy 0.02 or less, where RE is at least one of Y, Dy, Ho, Sm, Gd, Er, La, Ce, Nd, Tb, and Pr.

Since the dielectric ceramic composition for the dielectric layer is the same as the dielectric ceramic composition according to the previous exemplary embodiments, details thereof will be omitted.

Hereinafter, although the present inventive concept will be detailed with reference to Inventive and Comparative Examples, these examples are to help a specific understanding of the present inventive concept, and the scope of the present inventive concept is not limited thereto.

Experimental Examples

Components according to composition ratios provided in Tables 1, 3, and 5 were mixed with a dispersant, using ethanol and toluene as a solvent, and were then mixed with a binder to form ceramic sheets. Ni internal electrodes were printed onto the molded ceramic sheets, and the sheets were stacked, compressed, and cut to obtain chips. For a debinding process, the cut chips were plasticized and sintered at 1200° C. to 1300° C. Then, the chips were evaluated in view of capacitance, DF, RC, TCC, and resistance degradation behavior depending on an increase in voltage levels at a high temperature of 150° C.

$BaTiO_3$ powder having an average particle size of 400 nm was used as the major component. The raw material powder including the major component and the minor component was mixed with ethanol/toluene, a dispersant, and a binder by using a zirconia ball as a mixing/dispersion media, followed by ball milling for 20 hours.

The prepared slurry was formed as molded sheets each having a thickness of 10 μm by using a doctor blade coater. Ni internal electrodes were printed onto the molded sheets. Upper and lower covers were formed by stacking 25 cover sheets on 21 active sheets on which the internal electrodes were printed, and then pressurized to form a compressed bar. The compressed bar was cut by a cutting device to thereby obtain chips, each of which was 3216-sized (length×width× thickness: about 3.2 mm×1.6 mm×1.6 mm).

After each chip was plasticized and sintered under a reducing atmosphere (0.1% of $H_2$/99.9% of $N_2$, $H_2O/H_2/N_2$ atmosphere) at 1200° C. to 1300° C. for 2 hours, the sintered chip was heat-treated by performing reoxidation under a nitrogen ($N_2$) atmosphere at 1000° C. for 3 hours. The chip including dielectric layers having a fine structure and the internal electrodes was obtained.

A copper (Cu) paste was applied to the sintered chip and sintered to form external electrodes.

A proto-type sample, MLCC which was manufactured using the above-described method was evaluated in view of capacitance, DF, insulation resistance, TCC, and resistance degradation behavior depending on an increase in voltage levels at a high temperature of 150° C.

Room temperature capacitance and DF of the MLCC were measured under conditions of 1 kHz and AC 0.2 V/μm, using an LCR-meter. A dielectric constant of the MLCC was calculated from the capacitance of the MLCC and the thickness of the dielectric layer, an area of the internal electrodes, and the number of stacked layers in the MLCC.

Room temperature insulation resistance (IR) of each sample was measured after DC 10 V/μm was applied thereto for 60 seconds.

TCC was measured depending on temperature changes in a temperature range of −55° C. to 150° C.

In a high temperature IR voltage-boost test, resistance degradation behavior was measured by increasing a voltage level of 5 V/μm per each step at 150° C., wherein each step lasted 10 minutes and resistance values were measured at 5-second intervals.

High temperature withstand voltage was obtained from the high temperature IR voltage-boost test, wherein the withstand voltage refers to a maximum voltage allowing IR to be maintained at $10^5 \Omega$ or more when a DC voltage level of 5 V/μm was applied to the 3216-sized chip including 20 dielectric layers having a thickness of 7 μm after being sintered, at 150° C. for 10 minutes, and was then continuously increased by 5 V/μm per each step.

X-ray diffraction (XRD) analysis was carried out to verify whether a pyrochlore phase ($Y_2Ti_2O_7$) is present in the dielectric layer by determining whether a peak of the corresponding phase is present at about 30.5 degrees of an angle of diffraction (2θ).

The following Tables 1, 3 and 5 show compositions of Experimental Examples, and Tables 2, 4 and 6 show properties of proto-type MLCCs corresponding to the compositions indicated by Tables 1, 3 and 5.

TABLE 1

| | Number of Moles of Each Additive per 100 mol of Base Material (Major Component) | | | | | | | | | |
|---|---|---|---|---|---|---|---|---|---|---|
| | First Minor Component | | Second Minor Component | Third Minor Component | | Fourth Minor Component | Fifth Minor Component | | Sixth Minor Component | Additive (Ba + Ca)/Ni |
| Sample | $MnO_2$ | $V_2O_5$ | $MgCO_3$ | $Y_2O_3$ | $Dy_2O_3$ | $CaZrO_3$ | $BaCO_3$ | $CaCO_3$ | $SiO_2$ | Ratio |
| 1 | 0.400 | 0.000 | 0.00 | 0.00 | 0.00 | 2.00 | 2.200 | 0.000 | 1.25 | 1.76 |
| 2 | 0.400 | 0.000 | 0.00 | 0.10 | 0.00 | 2.00 | 2.200 | 0.000 | 1.25 | 1.76 |
| 3 | 0.400 | 0.000 | 0.00 | 0.35 | 0.00 | 2.00 | 2.200 | 0.000 | 1.25 | 1.76 |
| 4 | 0.400 | 0.000 | 0.00 | 0.50 | 0.00 | 2.00 | 2.200 | 0.000 | 1.25 | 1.76 |

TABLE 1-continued

| | Number of Moles of Each Additive per 100 mol of Base Material (Major Component) | | | | | | | | | |
|---|---|---|---|---|---|---|---|---|---|---|
| | First Minor Component | | Second Minor Component | Third Minor Component | Fourth Minor Component | | Fifth Minor Component | | Sixth Minor Component | Additive (Ba + Ca)/Ni |
| Sample | $MnO_2$ | $V_2O_5$ | $MgCO_3$ | $Y_2O_3$ | $Dy_2O_3$ | $CaZrO_3$ | $BaCO_3$ | $CaCO_3$ | $SiO_2$ | Ratio |
| 5 | 0.400 | 0.000 | 0.00 | 0.75 | 0.00 | 2.00 | 2.200 | 0.000 | 1.25 | 1.76 |
| 6 | 0.400 | 0.000 | 0.00 | 1.00 | 0.00 | 2.00 | 2.200 | 0.000 | 1.25 | 1.76 |
| 7 | 0.400 | 0.000 | 0.00 | 1.50 | 0.00 | 2.00 | 2.200 | 0000 | 1.25 | 1.76 |
| 8 | 0.400 | 0.000 | 0.00 | 2.50 | 0.00 | 2.00 | 2.200 | 0.000 | 1.25 | 1.76 |
| 9 | 0.400 | 0.000 | 0.00 | 3.00 | 0.00 | 2.00 | 2.200 | 0.000 | 1.25 | 1.76 |
| 10 | 0.400 | 0.000 | 0.05 | 0.75 | 0.00 | 2.00 | 2.200 | 0.000 | 1.25 | 1.76 |
| 11 | 0.400 | 0.000 | 0.10 | 0.75 | 0.00 | 2.00 | 2.200 | 0.000 | 1.25 | 1.76 |
| 12 | 0.400 | 0.000 | 0.20 | 0.75 | 0.00 | 2.00 | 2.200 | 0.000 | 1.25 | 1.76 |
| 13 | 0.400 | 0.000 | 0.30 | 0.75 | 0.00 | 2.00 | 2.200 | 0.000 | 1.25 | 1.76 |
| 14 | 0.400 | 0.000 | 0.50 | 0.75 | 0.00 | 2.00 | 2.200 | 0.000 | 1.25 | 1.76 |
| 15 | 0.400 | 0.000 | 1.00 | 0.75 | 0.00 | 2.00 | 2.200 | 0.000 | 1.25 | 1.76 |
| 16 | 0.400 | 0.000 | 0.00 | 0.75 | 0.00 | 0.00 | 2.200 | 0.000 | 1.25 | 1.76 |
| 17 | 0.400 | 0.000 | 0.00 | 0.75 | 0.00 | 0.25 | 2.200 | 0.000 | 1.25 | 1.76 |
| 18 | 0.400 | 0.000 | 0.00 | 0.75 | 0.00 | 0.50 | 2.200 | 0.000 | 1.25 | 1.76 |
| 19 | 0.400 | 0.000 | 0.00 | 0.75 | 0.00 | 1.00 | 2.200 | 0.000 | 1.25 | 1.76 |
| 20 | 0.400 | 0.000 | 0.00 | 0.75 | 0.00 | 3.00 | 2.200 | 0.000 | 1.25 | 1.76 |
| 21 | 0.400 | 0.000 | 0.00 | 0.75 | 0.00 | 4.00 | 2.200 | 0.000 | 1.25 | 1.76 |
| 22 | 0.400 | 0.000 | 0.00 | 0.75 | 0.00 | 5.00 | 2.200 | 0.000 | 1.25 | 1.76 |
| 23 | 0.400 | 0.000 | 0.00 | 0.75 | 0.00 | 7.00 | 2.200 | 0.000 | 1.25 | 1.76 |
| 24 | 0.000 | 0.000 | 0.00 | 0.75 | 0.00 | 3.00 | 2.200 | 0.000 | 1.25 | 1.76 |
| 25 | 0.100 | 0.000 | 0.00 | 0.75 | 0.00 | 3.00 | 2.200 | 0.000 | 1.25 | 1.76 |
| 26 | 0.200 | 0.000 | 0.00 | 0.75 | 0.00 | 3.00 | 2.200 | 0.000 | 1.25 | 1.76 |
| 27 | 0.300 | 0.000 | 0.00 | 0.75 | 0.00 | 3.00 | 2.200 | 0.000 | 1.25 | 1.76 |
| 28 | 0.600 | 0.000 | 0.00 | 0.75 | 0.00 | 3.00 | 2.200 | 0.000 | 1.25 | 1.76 |
| 29 | 1.000 | 0.000 | 0.00 | 0.75 | 0.00 | 3.00 | 2.200 | 0.000 | 1.25 | 1.76 |
| 30 | 1.500 | 0.000 | 0.00 | 0.75 | 0.00 | 3.00 | 2.200 | 0.000 | 1.25 | 1.76 |
| 31 | 2.000 | 0.000 | 0.00 | 0.75 | 0.00 | 3.00 | 2.200 | 0.000 | 1.25 | 1.76 |
| 32 | 0.300 | 0.050 | 0.00 | 0.75 | 0.00 | 3.00 | 2.200 | 0.000 | 1.25 | 1.76 |
| 33 | 0.200 | 0.100 | 0.00 | 0.75 | 0.00 | 3.00 | 2.200 | 0.000 | 1.25 | 1.76 |
| 34 | 0.000 | 0.200 | 0.00 | 0.75 | 0.00 | 3.00 | 2.200 | 0.000 | 1.25 | 1.76 |

TABLE 2

| | Proto-type Chip Properties Measurement Condition of Dielectric Properties (Dielectric Constant/OF/TCC): AC 0.2 V/μm | | | | | | | Ratio of | Propertise |
|---|---|---|---|---|---|---|---|---|---|
| Sample | Dielectric Constant | DF (%) | RC (ΩF) | TCC(%) (−55° C.) | TCC(%) (125° C.) | TCC(%) (150° C.) | High Temperature Withstand Voltage (V/μm)* | Peak of Pyrochloro Peak of $BaTiO_2$ | Evaluation ○: Good X: Bad Δ: Fair |
| 1 | 2458 | 3.56 | 1055 | −10.5% | −6.8% | −18.9% | 40 | <0.01 | X |
| 2 | 2217 | 3.25 | 1044 | −8.8% | −2.5% | −14.2% | 50 | <0.01 | Δ |
| 3 | 2245 | 3.22 | 1025 | −7.7% | −2.2% | −13.8% | 55 | <0.01 | ○ |
| 4 | 2193 | 3.14 | 1123 | −8.4% | −2.7% | −13.2% | 55 | <0.01 | ○ |
| 5 | 2154 | 3.23 | 1238 | −6.9% | −2.6% | −13.0% | 60 | <0.01 | ○ |
| 6 | 2085 | 2.98 | 1113 | −94% | −1.8% | −12.5% | 65 | <0.01 | ○ |
| 7 | 2034 | 2.95 | 1255 | −9.2% | −1.4% | −13.6% | 60 | <0.01 | ○ |
| 8 | 1956 | 2.76 | 1335 | −7.7% | −1.2% | −14.5% | 50 | 0.02 | Δ |
| 9 | 1846 | 2.35 | 1568 | −7.5% | −0.9% | −13.3% | 35 | 0.05 | X |
| 10 | 2067 | 2.31 | 1217 | −7.9% | −0.8% | −13.0% | 60 | <0.01 | ○ |
| 11 | 2058 | 2.24 | 1121 | −7.4% | −1.2% | −13.4% | 60 | <0.01 | ○ |
| 12 | 1975 | 2.22 | 1454 | −7.2% | −1.4% | −13.6% | 60 | <0.01 | ○ |
| 13 | 1933 | 2.16 | 1658 | −6.8% | −1.7% | −14.2% | 60 | <0.01 | ○ |
| 14 | 1954 | 2.18 | 1578 | −6.4% | −2.0% | −15.0% | 60 | <0.01 | Δ |
| 15 | 1976 | 2.11 | 1784 | −5.9% | −4.5% | −19.5% | 60 | <0.01 | X |
| 16 | 1954 | 2.43 | 1045 | −5.6% | 2.4% | −15.4% | 45 | <0.01 | X |
| 17 | 1966 | 2.52 | 1158 | −6.5% | 2.2% | −14.2% | 55 | <0.01 | ○ |
| 18 | 1978 | 2.61 | 1236 | −7.2% | 1.1% | −12.5% | 60 | <0.01 | ○ |
| 19 | 1994 | 2.74 | 1345 | −7.5% | 0.8% | −12.5% | 60 | <0.01 | ○ |
| 20 | 2246 | 2.99 | 1458 | −12.5% | −1.2% | −12.2% | 60 | <0.01 | ○ |
| 21 | 2358 | 3.25 | 1523 | −13.2% | −2.3% | −13.4% | 60 | <0.01 | ○ |
| 22 | 2477 | 3.78 | 1689 | −14.6% | −3.5% | −14.5% | 65 | <0.01 | ○ |
| 23 | 2658 | 4.56 | 1745 | −15.8% | −4.5% | −15.6% | 70 | <0.01 | X |

TABLE 2-continued

| | Proto-type Chip Properties Measurement Condition of Dielectric Properties (Dielectric Constant/OF/TCC): AC 0.2 V/μm | | | | | | | Ratio of | Propertise |
|---|---|---|---|---|---|---|---|---|---|
| Sample | Dielectric Constant | DF (%) | RC (ΩF) | TCC(%) (−55° C.) | TCC(%) (125° C.) | TCC(%) (150° C.) | High Temperature Withstand Voltage (V/μm)* | Peak of Pyrochloro Peak of BaTiO$_2$ | Evaluation ○: Good X: Bad Δ: Fair |
| 24 | — | — | 0.2 | — | — | — | 5 | <0.01 | X |
| 25 | 2043 | 4.52 | 355 | −1.2% | 1.2% | −13.8% | 10 | <0.01 | X |
| 26 | 2011 | 4.12 | 1673 | −0.5% | 1.1% | −14.4% | 50 | <0.01 | ○ |
| 27 | 2067 | 3.55 | 1248 | −0.8% | −0.5% | −13.5% | 55 | <0.01 | ○ |
| 28 | 1976 | 2.99 | 987 | −0.4% | −1.1% | −12.9% | 60 | <0.01 | ○ |
| 29 | 1955 | 2.72 | 885 | 0.7% | −1.5% | −12.6% | 65 | <0.01 | ○ |
| 30 | 1834 | 2.12 | 825 | 1.1% | −1.8% | −13.4% | 70 | <0.01 | ○ |
| 31 | 1825 | 1.78 | 504 | 1.2% | −0.7% | −12.9% | 60 | <0.01 | Δ |
| 32 | 2010 | 2.26 | 1045 | 1.3% | 0.5% | −12.5% | 60 | <0.01 | ○ |
| 33 | 1939 | 2.17 | 967 | 0.8% | 0.8% | −12.9% | 60 | <0.01 | ○ |
| 34 | 1932 | 2.32 | 754 | 1.2% | 2.3% | −12.7% | 60 | <0.01 | ○ |

Samples 1 to 9 of Table 1 were obtained by changing the content of the rare-earth element (Y) in the third minor component, under the following conditions: the first minor component included variable-valence acceptor elements, Mn and V having a total content of 0.4 mol, the second minor component included Mg having a content of 0 mol, the fourth minor component included CaZrO$_3$ having a content of 2 mol, the fifth minor component included Ba and Ca having a total content of 2.2 mol, the sixth minor component included Si having a content of 1.25 mol, on the basis of 100 mol of BaTiO$_3$ (BT); and a (Ba+Ca)/Si ratio between the total content of the fifth minor component (Ba+Ca) and the content of the sixth minor component (Si) was fixed to 1.76, and respective properties of the corresponding samples of Table 1 are shown in Table 2.

When the content of the third minor component Y was 0 mol (sample 1), TCC at a high temperature of 150° C. was out of ±15%, and high temperature withstand voltage was less than 50 V/μm, and when the content of the third minor component Y was 5 mol or more, an excessive amount (samples 8 and 9), the high temperature withstand voltage characteristics deteriorated due to the formation of the pyrochloro phase (Y$_2$Ti$_2$O$_7$). In particular, the high temperature withstand voltage was maintained to be 50 V/μm or more until the content of the pyrochlore phase was 2% (sample 8). However, when the content of the pyrochlore phase was increased to be 5.0% (sample 9), the high temperature withstand voltage characteristics rapidly deteriorated. Therefore, it can be seen that the content of the third minor component Y is appropriately determined as 0.2 mol≤Y≤5.0 mol, on the basis of 100 parts by mol of the major component, and in this case, a fine structure having the pyrochlore phase of 2% or less is obtained.

Samples 10 to 15 of Table 1 were obtained by changing the content of the second minor component Mg, and respective properties of the corresponding samples of Table 1 are shown in Table 2. As the Mg content was increased, absolute values of TCC at a high temperature of 150° C. were gradually increased, and TCC at a high temperature of 150° C. satisfied the X8R characteristics until the Mg content was 0.5 mol, and when the Mg content was more than 0.5 mol, TCC at a high temperature of 150° C. deviated from the X8R characteristics (sample 15), and it could be confirmed that there were no significant difference in the high temperature withstand voltage characteristics according to the Mg content. Therefore, it can be seen that the content of the second minor component Mg is appropriately determined as Mg0.5 mol, on the basis of 100 parts by mol of the major component.

Samples 16 to 23 of Table 1 were obtained by changing the content of the fourth minor component CaZrO$_3$ (CZ), and respective properties of the corresponding samples of Table 1 are shown in Table 2. In a case in which CZ was not added (sample 16), TCC at a high temperature of 150° C. did not satisfy the X8R characteristics, and as the CZ content was increased, TCC at a high temperature of 150° C. was decreased and then increased again, and the high temperature withstand voltage characteristics were improved. When the CZ content was 7 mol, an excessive amount (sample 23), on the basis of 100 parts by mol of the major component, TCC at a high temperature of 150° C. deviated from the X8R characteristics. Therefore, it can be seen that the content of the fourth minor component CaZrO$_3$ (CZ) is appropriately determined as 0.25 mol≤CaZrO$_3$≤5.0 mol, on the basis of 100 parts by mol of the major component.

Samples 24 to 31 of Table 1 were obtained by changing the content of the first minor component Mn, and respective properties of the corresponding samples of Table 1 are shown in Table 2. When the Mn content was 0.1% or less (samples 24 and 25), low reducibility was not secured, and thus, the RC value was significantly low or the high temperature withstand voltage was decreased. As the Mn content was increased, the high temperature withstand voltage characteristics were improved without a significant change in TCC at a high temperature of 150° C., and when the Mn content was excessively increased (sample 31), the RC value was decreased. Therefore, it can be seen that the content of the first minor component Mn is appropriately determined as 0.2 mol≤Mn≤2.0 mol, on the basis of 100 parts by mol of the major component.

Samples 32 to 34 of Table 1 were obtained by changing ratios between Mn and V when the total content of the first minor component Mn and V was 0.4 mol, and respective properties of the corresponding samples of Table 1 are shown in Table 2. As Mn was partially or entirely changed to V, the RC value was slightly decreased, and the X8R characteristics were satisfactory without significant changes in high temperature withstand voltage and TCC at a high temperature of 150° C. Therefore, the first minor component may include at least one of Mn, V, and transition metal elements such as Cr, Fe, Co, Ni, Cu and Zn which are variable-valence acceptor elements.

TABLE 3

Number of Moles of Each Additive per 100 mol of Base Material (Major Component)

| | First Minor Component | | Second Minor Component | Third Minor Component | | Fourth Minor Component | Fifth Minor Component | | Sixth Minor Component | Additive (Ba + Ca)/ Si |
|---|---|---|---|---|---|---|---|---|---|---|
| Sample | MnO$_2$ | V$_2$O$_5$ | MgCO$_3$ | Y$_2$O$_3$ | Dy$_2$O$_3$ | CaZrO$_3$ | BaCO$_3$ | CaCO$_3$ | SiO$_2$ | Ratio |
| 35 | 0.400 | 0.000 | 0.00 | 0.75 | 0.00 | 2.00 | 1.650 | 0.550 | 1.25 | 1.76 |
| 36 | 0.400 | 0.000 | 0.00 | 0.75 | 0.00 | 2.00 | 1.100 | 1.100 | 1.25 | 1.76 |
| 37 | 0.400 | 0.000 | 0.00 | 0.75 | 0.00 | 2.00 | 0.550 | 1.650 | 1.25 | 1.76 |
| 38 | 0.400 | 0.000 | 0.00 | 0.75 | 0.00 | 2.00 | 0.000 | 2.200 | 1.25 | 1.76 |
| 39 | 0.400 | 0.400 | 0.00 | 0.75 | 0.00 | 2.00 | 1.600 | 0.000 | 1.25 | 1.28 |
| 40 | 0.400 | 0.400 | 0.00 | 0.75 | 0.00 | 2.00 | 1.600 | 0.000 | 1.25 | 1.44 |
| 41 | 0.400 | 0.400 | 0.00 | 0.75 | 0.00 | 2.00 | 2.400 | 0.000 | 1.25 | 1.92 |
| 42 | 0.400 | 0.400 | 0.00 | 0.75 | 0.00 | 2.00 | 2.800 | 0.000 | 1.25 | 2.15 |
| 43 | 0.400 | 0.400 | 0.00 | 0.75 | 0.00 | 2.00 | 3.200 | 0.000 | 1.25 | 2.56 |
| 44 | 0.400 | 0.400 | 0.00 | 0.75 | 0.00 | 2.00 | 3.600 | 0.000 | 1.25 | 2.88 |
| 45 | 0.400 | 0.400 | 0.00 | 0.75 | 0.00 | 2.00 | 0.527 | 0.000 | 0.30 | 1.76 |
| 46 | 0.400 | 0.400 | 0.00 | 0.75 | 0.00 | 2.00 | 0.600 | 0.000 | 0.50 | 1.20 |
| 47 | 0.400 | 0.400 | 0.00 | 0.75 | 0.00 | 2.00 | 0.720 | 0.000 | 0.50 | 1.44 |
| 48 | 0.400 | 0.400 | 0.00 | 0.75 | 0.00 | 2.00 | 0.880 | 0.000 | 0.50 | 1.76 |
| 49 | 0.400 | 0.400 | 0.00 | 0.75 | 0.00 | 2.00 | 1.280 | 0.000 | 0.50 | 2.56 |
| 50 | 0.400 | 0.400 | 0.00 | 0.75 | 0.00 | 2.00 | 1.440 | 0.000 | 0.50 | 2.88 |
| 51 | 0.400 | 0.400 | 0.00 | 0.75 | 0.00 | 2.00 | 1.440 | 0.000 | 1.00 | 1.44 |
| 52 | 0.400 | 0.400 | 0.00 | 0.75 | 0.00 | 2.00 | 1.760 | 0.000 | 1.00 | 1.76 |
| 53 | 0.400 | 0.400 | 0.00 | 0.75 | 0.00 | 2.00 | 2.560 | 0.000 | 1.00 | 2.56 |
| 54 | 0.400 | 0.400 | 0.00 | 0.75 | 0.00 | 2.00 | 2.880 | 0.000 | 1.00 | 2.88 |
| 55 | 0.400 | 0.400 | 0.00 | 0.75 | 0.00 | 2.00 | 2.400 | 0.000 | 2.00 | 1.20 |
| 56 | 0.400 | 0.400 | 0.00 | 0.75 | 0.00 | 2.00 | 2.880 | 0.000 | 2.00 | 1.44 |
| 57 | 0.400 | 0.400 | 0.00 | 0.75 | 0.00 | 2.00 | 3.520 | 0.000 | 2.00 | 1.76 |
| 58 | 0.400 | 0.400 | 0.00 | 0.75 | 0.00 | 2.00 | 5.120 | 0.000 | 2.00 | 2.56 |
| 59 | 0.400 | 0.400 | 0.00 | 0.75 | 0.00 | 2.00 | 5750 | 0.000 | 2.00 | 2.88 |
| 60 | 0.400 | 0.400 | 0.00 | 0.75 | 0.00 | 2.00 | 3.600 | 0.000 | 3.00 | 1.20 |
| 61 | 0.400 | 0.400 | 0.00 | 0.75 | 0.00 | 2.00 | 4.320 | 0.000 | 3.00 | 1.44 |
| 62 | 0.400 | 0.400 | 0.00 | 0.75 | 0.00 | 2.00 | 5.280 | 0.000 | 3.00 | 1.76 |
| 63 | 0.400 | 0.400 | 0.00 | 0.75 | 0.00 | 2.00 | 7.680 | 0.000 | 3.00 | 2.56 |
| 64 | 0.400 | 0.400 | 0.00 | 0.75 | 0.00 | 2.00 | 8.640 | 0.000 | 3.00 | 2.88 |
| 65 | 0.400 | 0.400 | 0.00 | 0.75 | 0.00 | 2.00 | 6.160 | 0.000 | 3.50 | 1.76 |

TABLE 4

Proto-type Chip Properties
Measurement Condition of Dielectric Properties (Dielectric Constant/OF/TCC): AC 0.2 V/μm

| Sample | Dielectric Constant | DF (%) | RC (ΩF) | TCC(%) (−55° C.) | TCC(%) (125° C.) | TCC(%) (150° C.) | High Temperture Withstand Voltage (V/μm)* | Ratio of Peak of Pyrochloro Peak of BaTiO2 | Properties Evaluation ○: Good X: Bad Δ: Fair |
|---|---|---|---|---|---|---|---|---|---|
| 35 | 2054 | 3.23 | 1238 | −8.9% | −2.6% | −13.0% | 60 | <0.01 | ○ |
| 36 | 2001 | 3.12 | 1134 | −8.8% | −2.5% | −13.5% | 60 | <0.01 | ○ |
| 37 | 2075 | 3.15 | 1254 | −8.2% | −2.4% | −13.9% | 60 | <0.01 | ○ |
| 38 | 2038 | 3.08 | 1321 | −8.1% | −2.3% | −13.7% | 60 | <0.01 | ○ |
| 39 | 3256 | 4.12 | 1643 | −1.2% | −5.8% | −20.9% | 40 | <0.01 | X |
| 40 | 2458 | 3.68 | 1255 | −8.5% | −3.0% | −14.6% | 50 | <0.01 | ○ |
| 41 | 2038 | 3.36 | 1054 | −8.9% | −3.7% | −13.5% | 55 | <0.01 | ○ |
| 42 | 2132 | 3.34 | 1125 | −8.5% | −2.5% | −13.7% | 60 | <0.01 | ○ |
| 43 | 2036 | 3.25 | 1082 | −9.3% | −2.3% | −12.9% | 60 | <0.01 | ○ |
| 44 | 1897 | 2.64 | 1234 | −9.2% | −2.3% | −12.8% | 40 | <0.01 | X |
| 45 | 1548 | 1.64 | 1326 | −9.9% | −1.5% | −13.0% | 40 | <0.01 | X |
| 46 | 3455 | 4.68 | 1212 | −9.6% | −1.8% | −18.5% | 35 | <0.01 | X |
| 47 | 2112 | 3.17 | 1174 | −9.7% | −1.2% | −15.0% | 50 | <0.01 | Δ |
| 48 | 2035 | 2.88 | 1024 | −9.3% | −2.5% | −13.9% | 60 | <0.01 | ○ |
| 49 | 2007 | 2.74 | 1123 | −9.8% | −2.5% | −13.8% | 55 | <0.01 | ○ |
| 50 | 1987 | 2.44 | 1548 | −8.8% | −1.5% | −12.9% | 45 | <0.01 | X |
| 51 | 2108 | 1.85 | 1174 | −9.5% | −1.4% | −14.2% | 50 | <0.01 | ○ |
| 52 | 2347 | 2.11 | 1005 | −9.9% | −1.7% | −14.5% | 60 | <0.01 | ○ |
| 53 | 2156 | 2.06 | 1143 | −9.1% | −1.5% | −14.8% | 55 | <0.01 | ○ |
| 54 | 1888 | 1.94 | 1245 | −9.2% | −1.2% | −13.5% | 45 | <0.01 | X |
| 55 | 3356 | 4.18 | 1123 | −9.7% | −1.1% | −19.7% | 40 | <0.01 | X |
| 56 | 2006 | 2.80 | 1078 | −9.9% | −1.2% | −11.9% | 50 | <0.01 | ○ |
| 57 | 1965 | 2.56 | 1037 | −10.2% | −1.4% | −11.5% | 60 | <0.01 | ○ |
| 58 | 1956 | 2.48 | 1085 | −10.2% | −1.3% | −12.2% | 60 | <0.01 | ○ |
| 59 | 1789 | 2.26 | 1109 | −10.9% | −0.8% | −11.4% | 45 | <0.01 | X |

TABLE 4-continued

Proto-type Chip Properties
Measurement Condition of Dielectric Properties (Dielectric Constant/OF/TCC): AC 0.2 V/μm

| Sample | Dielectric Constant | DF (%) | RC (ΩF) | TCC(%) (−55° C.) | TCC(%) (125° C.) | TCC(%) (150° C.) | High Temperture Withstand Voltage (V/μm)* | Ratio of Peak of Pyrochloro Peak of BaTiO2 | Properties Evaluation ○: Good X: Bad Δ: Fair |
|---|---|---|---|---|---|---|---|---|---|
| 60 | 2845 | 4.04 | 1034 | −10.3% | −1.7% | −16.4% | 40 | <0.01 | X |
| 61 | 1998 | 2.76 | 1023 | −10.4% | −1.8% | −13.2% | 50 | <0.01 | ○ |
| 62 | 1908 | 3.02 | 1006 | −10.2% | −1.8% | −13.6% | 55 | <0.01 | ○ |
| 63 | 1899 | 3.03 | 995 | −10.6% | −1.4% | −13.4% | 55 | <0.01 | ○ |
| 64 | 1755 | 2.77 | 893 | −9.5% | −1.9% | −14.0% | 45 | 0.015 | X |
| 65 | 1997 | 2.83 | 933 | −9.5% | −1.6% | −13.8% | 36 | 0.02 | X |

Samples 35 to 38 of Table 3 were obtained by partially or entirely changing Ba to Ca in the fifth minor component as compared with the composition of sample 5, and respective properties of the corresponding samples of Table 3 are shown in Table 4. When samples 35 to 38 were compared with sample 5, it can be seen that samples 35 to 38 had almost the same dielectric constant, DF, RC, TCC, and high temperature withstand voltage as those of sample 5. Therefore, the fifth minor component may include at least one of Ba and Ca.

Samples 39 to 44 of Table 3 were obtained by fixing the $SiO_2$ content in the sixth minor component to 1.25 mol and changing the Ba content in the fifth minor component and the (Ba+Ca)/Si ratio, and respective properties of the corresponding samples of Table 3 are shown in Table 4. When the (Ba+Ca)/Si ratio was decreased to be 1.28 (sample 39), the dielectric constant was significantly increased to be 3000 or more, and therefore, TCC at a high temperature of 150° C. deteriorated, and high temperature withstand voltage was decreased to be 40 V/μm. As the Ba content and the (Ba+Ca)/Si ratio were increased, the dielectric constant was decreased and the high temperature withstand voltage was increased. However, when the Ba content and the (Ba+Ca)/Si ratio were excessively increased to be 2.88 (sample 44), the dielectric constant was slightly decreased to be 2000 or less, and the high temperature withstand voltage was decreased to be 40 V/μm. Therefore, it can be seen that when the $SiO_2$ content is 1.25 mol %, the (Ba+Ca)/Si ratio is appropriately determined as 1.44 to 2.56, and the content of the fifth minor component (Ba+Ca) is appropriately determined as 1.8 to 3.2 mol.

Sample 45 of Table 3 was obtained by fixing the (Ba+Ca)/Si ratio to 1.76, and decreasing the (Ba+Ca) content and the Si content to be 0.527 mol and 0.3 mol, respectively, and respective properties of the corresponding sample of Table 3 are shown in Table 4. In a case in which the Si content was decreased to be 0.3 mol, even when the (Ba+Ca)/Si ratio was included in an appropriate range, the dielectric constant was decreased to be 1548, and the high temperature withstand voltage was also decreased to be 40 V/μm.

Samples 46 to 50 of Table 3 were obtained by changing the Ba content in the fifth minor component and the (Ba+Ca)/Si ratio when the $SiO_2$ content in the sixth minor component was 0.5 mol, and respective properties of the corresponding samples of Table 3 are shown in Table 4. When the (Ba+Ca)/Si ratio was excessively decreased to be 1.2 (sample 46), or was excessively increased to be 2.88 (sample 50), the high temperature withstand voltage was decreased to be less than 45 V/μm. Therefore, it can be seen that when the $SiO_2$ content is 0.5 mol, the (Ba+Ca)/Si ratio is appropriately determined as 1.44 to 2.56, and the content of the fifth minor component (Ba+Ca) is appropriately determined as 0.72 to 1.28 parts by mol.

Samples 51 to 54, 55 to 59, and 60 to 64 of Table 3 were obtained by fixing the $SiO_2$ content to 1.0 mol, 2.0 mol, and 3.0 mol, respectively, and changing the Ba content and the (Ba+Ca)/Si ratio, and respective properties of the corresponding samples of Table 3 are shown in Table 4. In a case in which the $SiO_2$ content was adjusted to 1.0 mol, 2.0 mol, and 3.0 mol, when the Ba content was adjusted to allow the (Ba+Ca)/Si ratio to be less than 1.44 or more than 2.56 (samples 54, 55, 59, 60 and 64), the high temperature withstand voltage was decreased to be 45 V/μm or less, or TCC at a high temperature of 150° C. was out of ±15%. Therefore, it can be seen that the (Ba+Ca)/Si ratio is appropriately determined as 1.44≤(Ba+Ca)/Si≤2.56.

Sample 65 of Table 3 was obtained by fixing the (Ba+Ca)/Si ratio to 1.76, and adjusting the content of (Ba+Ca) and $SiO_2$ to be excessively increased to be 6.16 mol and 3.50 mol, respectively, and respective properties of the corresponding sample of Table 3 are shown in Table 4. In a case in which the Si content was an excessive amount of 3.50, even when the (Ba+Ca)/Si ratio was included in an appropriate range, the dielectric constant was decreased to be 2000 or less, and the pyrochlore phase was formed, and the high temperature withstand voltage was decreased to be less than 40 V/μm.

Therefore, from the results of samples 39 to 65, it can be seen that the content of the fifth minor component (Ba+Ca) satisfies 0.72 mol≤(Ba+Ca)≤7.68 mol, and the content of the sixth minor component (Si) satisfies 0.5 mol≤Si≤3.0 mol, on the basis of 100 parts by mol of the major component, while the (Ba+Ca)/Si ratio satisfies 1.44≤(Ba+Ca)/Si≤2.56.

TABLE 5

Number of Moles of Third Minor Component per 100 mol of Base Material (Major Component) (Number of Moles of Other Minor Components: Same as Sample No. 5)

| Sample | $Y_2O_3$ | $Dy_2O_3$ | $Ho_2O_3$ | $Sm_2O_3$ | $Gd_2O_3$ | $Er_2O_3$ | $Tm_2O_3$ | $Yb_2O_3$ |
|---|---|---|---|---|---|---|---|---|
| 66 | 0.000 | 1.00 | 0.000 | 0.000 | 0.000 | 0.000 | 0.000 | 0.000 |
| 67 | 0.000 | 1.50 | 0.000 | 0.000 | 0.000 | 0.000 | 0.000 | 0.000 |
| 68 | 0.000 | 2.50 | 0.000 | 0.000 | 0.000 | 0.000 | 0.000 | 0.000 |

TABLE 5-continued

Number of Moles of Third Minor Component per 100 mol of Base Material (Major Component) (Number of Moles of Other Minor Components: Same as Sample No. 5)

| Sample | $Y_2O_3$ | $Dy_2O_3$ | $Ho_2O_3$ | $Sm_2O_3$ | $Gd_2O_3$ | $Er_2O_3$ | $Tm_2O_3$ | $Yb_2O_3$ |
|---|---|---|---|---|---|---|---|---|
| 69 | 0.000 | 3.00 | 0.000 | 0.000 | 0.000 | 0.000 | 0.000 | 0.000 |
| 70 | 0.000 | 0.000 | 1.00 | 0.000 | 0.000 | 0.000 | 0.000 | 0.000 |
| 71 | 0.000 | 0.000 | 1.50 | 0.000 | 0.000 | 0.000 | 0.000 | 0.000 |
| 72 | 0.000 | 0.000 | 2.50 | 0.000 | 0.000 | 0.000 | 0.000 | 0.000 |
| 73 | 0.000 | 0.000 | 3.00 | 0.000 | 0.000 | 0.000 | 0.000 | 0.000 |
| 74 | 0.000 | 0.000 | 0.000 | 1.00 | 0.00 | 0.000 | 0.000 | 0.000 |
| 75 | 0.000 | 0.000 | 0.000 | 1.50 | 0.000 | 0.000 | 0.000 | 0.000 |
| 76 | 0.000 | 0.000 | 0.000 | 2.50 | 0.000 | 0.000 | 0.000 | 0.000 |
| 77 | 0.000 | 0.000 | 0.000 | 3.00 | 0.000 | 0.000 | 0.000 | 0.000 |
| 78 | 0.000 | 0.000 | 0.000 | 0.000 | 1.00 | 0.000 | 0.000 | 0.000 |
| 79 | 0.000 | 0.000 | 0.000 | 0.000 | 1.50 | 0.000 | 0.000 | 0.000 |
| 80 | 0.000 | 0.000 | 0.000 | 0.000 | 2.50 | 0.000 | 0.000 | 0.000 |
| 81 | 0.000 | 0.000 | 0.000 | 0.000 | 3.00 | 0.000 | 0.000 | 0.000 |
| 82 | 0.000 | 0.000 | 0.000 | 0.000 | 0.000 | 1.00 | 0.000 | 0.000 |
| 83 | 0.000 | 0.000 | 0.000 | 0.000 | 0.000 | 1.50 | 0.000 | 0.000 |
| 84 | 0.000 | 0.000 | 0.000 | 0.000 | 0.000 | 2.50 | 0.000 | 0.000 |
| 85 | 0.000 | 0.000 | 0.000 | 0.000 | 0.000 | 3.00 | 0.000 | 0.000 |
| 86 | 0.000 | 0.000 | 0.000 | 0.000 | 0.000 | 0.000 | 1.00 | 0.000 |
| 87 | 0.000 | 0.000 | 0.000 | 0.000 | 0.000 | 0.000 | 1.50 | 0.000 |
| 88 | 0.000 | 0.000 | 0.000 | 0.000 | 0.000 | 0.000 | 2.50 | 0.000 |
| 89 | 0.000 | 0.000 | 0.000 | 0.000 | 0.000 | 0.000 | 3.00 | 0.000 |
| 90 | 0.000 | 0.000 | 0.000 | 0.000 | 0.000 | 0.000 | 0.000 | 1.00 |
| 91 | 0.000 | 0.000 | 0.000 | 0.000 | 0.000 | 0.000 | 0.000 | 1.50 |
| 92 | 0.000 | 0.000 | 0.000 | 0.000 | 0.000 | 0.000 | 0.000 | 2.50 |
| 93 | 0.000 | 0.000 | 0.000 | 0.000 | 0.000 | 0.000 | 0.000 | 3.00 |

TABLE 6

Proto-type Chip Properties
Measurement Condition of Dielectric Properties (Dielectric Constant/OF/TCC): AC 0.2 V/μm

| Sample | Dielectric Constant | DF (%) | RC (ΩF) | TCC(%) (−55° C.) | TCC(%) (125° C.) | TCC(%) (150° C.) | High Temperture Ultrasound Voltage (V/μm)* | Ratio of Peak of Pyrochloro Peak of $BaTiO_2$ | Properties Evaluation ○: Good X: Bad Δ: Fair |
|---|---|---|---|---|---|---|---|---|---|
| 66 | 2158 | 2.89 | 1213 | −9.2% | −1.9% | −12.2% | 75 | <0.01 | ○ |
| 67 | 2146 | 2.85 | 1325 | −9.1% | −1.3% | −13.3% | 65 | <0.01 | ○ |
| 68 | 2054 | 2.65 | 1415 | −7.8% | −1.4% | −14.7% | 60 | 0.015 | Δ |
| 69 | 1876 | 2.24 | 1598 | −7.1% | −0.5% | −13.1% | 45 | 0.03 | X |
| 70 | 2088 | 2.98 | 1113 | −9.4% | −1.8% | −12.5% | 75 | <0.01 | ○ |
| 71 | 2079 | 2.99 | 1238 | −9.2% | −1.4% | −13.6% | 65 | <0.01 | ○ |
| 72 | 2064 | 2.84 | 1367 | −7.7% | −1.2% | −14.5% | 60 | 0.015 | Δ |
| 73 | 1758 | 2.04 | 1542 | −7.5% | −0.9% | −13.3% | 45 | 0.04 | X |
| 74 | 2188 | 2.89 | 1154 | −9.4% | −1.8% | −12.5% | 65 | <0.01 | ○ |
| 75 | 2079 | 2.99 | 1238 | −9.2% | −1.4% | −13.6% | 65 | <0.01 | ○ |
| 76 | 2004 | 2.84 | 1367 | −7.7% | −1.2% | −14.5% | 50 | 0.015 | Δ |
| 77 | 1758 | 2.04 | 1542 | −7.5% | −0.9% | −13.3% | 35 | 0.03 | X |
| 78 | 2195 | 2.98 | 1146 | −9.0% | −1.5% | −13.4% | 60 | <0.01 | ○ |
| 79 | 2089 | 2.95 | 1232 | −9.1% | −1.8% | −13.8% | 60 | <0.01 | ○ |
| 80 | 2025 | 2.85 | 1358 | −7.8% | −1.0% | −14.2% | 55 | 0.015 | Δ |
| 81 | 2032 | 2.24 | 1528 | −7.5% | −1.2% | −13.0% | 35 | 0.03 | X |
| 82 | 2032 | 2.88 | 1233 | −9.2% | 0.8% | −11.8% | 65 | <0.01 | ○ |
| 83 | 2081 | 2.85 | 1322 | −9.8% | 0.5% | −12.5% | 60 | <0.01 | ○ |
| 84 | 1954 | 2.66 | 1427 | −8.2% | 0.2% | −138.0% | 50 | 0.02 | Δ |
| 85 | 1846 | 2.25 | 1628 | −8.5% | 0.7% | −14.5% | 35 | 0.05 | X |
| 86 | 2082 | 2.88 | 1233 | −9.2% | 0.8% | −11.8% | 45 | <0.01 | X |
| 87 | 2081 | 2.85 | 1322 | −9.8% | 0.5% | −12.5% | 35 | 0.015 | X |
| 88 | 1954 | 2.66 | 1427 | −8.2% | 0.2% | −13.8% | 25 | 0.03 | X |
| 89 | 1846 | 2.25 | 1628 | −8.5% | 0.7% | −14.5% | 20 | 0.05 | X |
| 90 | 2056 | 2.77 | 1344 | −10.2% | 1.5% | −8.8% | 40 | <0.01 | X |
| 91 | 2061 | 2.75 | 1427 | −10.5% | 1.2% | −9.5% | 35 | 0.02 | X |
| 92 | 1948 | 2.64 | 1515 | −9.8% | 1.1% | −8.4% | 20 | 0.035 | X |
| 93 | 1854 | 2.15 | 1625 | −9.5% | 1.6% | −7.4% | 15 | 0.06 | X |

Samples 66 to 93 of Table 5 were obtained by changing the third minor component (Y) to other rare-earth elements, and respective properties of the corresponding samples of Table 5 are shown in Table 6. Samples 66 to 69, samples 70 to 73, samples 74 to 77, samples 78 to 81, and samples 82 to 85 were obtained by using Dy, Ho, Sm, Gd, Er instead of Y, respectively. It can be seen that when these samples were compared with samples 6 to 9 to which Y is applied, they had almost the same dielectric constant, DF, RC, TCC, and high temperature withstand voltage. Meanwhile, samples 86 to 89 and samples 90 to 93 were obtained by using Tm and Yb instead of Y, respectively. In the XRD analysis of the samples to which Tm or Yb were applied, even when the ratio of the peak of pyrochlore to the peak of $BaTiO_3$ was 0.02 or less, the high temperature withstand voltage was less than 50 V/μm (samples 87 and 91), and as compared with the samples obtained by using Y, Dy, Ho, Sm, Gd or Er under the same content of the corresponding rare-earth element, the ratio of the peak of pyrochlore to the peak of $BaTiO_3$ was relatively high, and the high temperature withstand voltage was significantly decreased. Therefore, it can be seen that the third minor component includes at least one of Y, Dy, Ho, Sm, Gd, Er, La, Ce, Nd, Tb, and Pr.

As set forth above, according to exemplary embodiments of the present disclosure, there are provided a dielectric ceramic composition satisfying X8R temperature characteristics and having excellent high temperature withstand voltage characteristics, and a dielectric material and a multilayer ceramic capacitor including the same.

In addition, by adjusting relative intensity of the pyrochlore phase in an XRD analysis, the dielectric ceramic composition having excellent reliability, the dielectric material, and the multilayer ceramic capacitor including the same, may be achieved.

While exemplary embodiments have been shown and described above, it will be apparent to those skilled in the art that modifications and variations could be made without departing from the scope of the invention as defined by the appended claims.

What is claimed is:

1. A dielectric ceramic composition comprising:
   a major component (a barium titanate-based base material); and
   a minor component,
   wherein the dielectric ceramic composition is sintered to form a sintered body, and in an XRD analysis of the sintered body, when a (110) peak of $BaTiO_3$ is set as 1.00, a ratio of a peak of pyrochlore ($RE_2Ti_2O_7$) at about 30.5 degrees with respect to the (110) peak of $BaTiO_3$ satisfies 0.02 or less,
   where RE is at least one of Y, Dy, Ho, Sm, Gd, Er, La, Ce, Nd, Tb, and Pr, and
   the minor component includes:
   a fifth minor component including at least one selected from the group consisting of oxides and carbonates of at least one of Ba and Ca; and
   a sixth minor component including at least one selected from the group consisting of oxides and carbonates of Si, and glass including Si, and
   when a total content of the at least one of Ba and Ca included in the fifth minor component is x and a content of Si included in the sixth minor component is y, x/y satisfies 1.44 to 2.56.

2. The dielectric ceramic composition of claim 1, wherein the major component includes at least one selected from the group consisting of $BaTiO_3$, $(Ba_{1-x}Ca_x)(Ti_{1-y}Ca_y)O_3$ ($0 \leq x \leq 0.3$ and $0 \leq y \leq 0.1$), $(Ba_{1-x}Ca_x)(Ti_{1-y}Zr_y)O_3$ ($0 \leq x \leq 0.3$ and $0 \leq y \leq 0.5$), and $Ba(Ti_{1-y}Zr_y)O_3$ ($0 \leq y \leq 0.5$).

3. The dielectric ceramic composition of claim 1, wherein the minor component further includes at least one of the following components:
   a first minor component including at least one selected from the group consisting of oxides and carbonates of at least one of variable-valence acceptor elements including Mn, V, Cr, Fe, Ni, Co, Cu, and Zn;
   a second minor component including at least one selected from the group consisting of oxides and carbonates of a fixed-valence acceptor element including Mg;
   a third minor component including at least one selected from the group consisting of oxides and carbonates of at least one of Y, Dy, Ho, Sm, Gd, Er, La, Ce, Nd, Tb, and Pr; and
   a fourth minor component including $CaZrO_3$.

4. The dielectric ceramic composition of claim 1, wherein the minor component further includes a first minor component including at least one selected from the group consisting of oxides and carbonates of at least one of variable-valence acceptor elements including Mn, V, Cr, Fe, Ni, Co, Cu, and Zn, and
   the at least one of variable-valence acceptor elements of Mn, V, Cr, Fe, Ni, Co, Cu, and Zn included in the first minor component has a total content of 0.2 to 2.0 parts by mol on the basis of 100 parts by mol of the major component.

5. The dielectric ceramic composition of claim 1, wherein the minor component further includes a second minor component including at least one selected from the group consisting of oxides and carbonates of a fixed-valence acceptor element including Mg, and
   the fixed-valence acceptor element including Mg included in the second minor component has a content of 0.5 parts by mol or less on the basis of 100 parts by mol of the major component.

6. The dielectric ceramic composition of claim 1, wherein the minor component further includes a third minor component including at least one selected from the group consisting of oxides and carbonates of at least one of Y, Dy, Ho, Sm, Gd, Er, La, Ce, Nd, Tb, and Pr included in the third minor component has a total content of 0.2 to 5.0 parts by mol on the basis of 100 parts by mol of the major component.

7. The dielectric ceramic composition of claim 1, wherein the minor component further includes a fourth minor component including $CaZrO_3$, and
   $CaZrO_3$ has a content of 0.25 to 5.0 parts by mol on the basis of 100 parts by mol of the major component.

8. The dielectric ceramic composition of claim 1, wherein the at least one of Ba and Ca included in the fifth minor component has a total content of 0.72 to 7.68 parts by mol on the basis of 100 parts by mol of the major component.

9. The dielectric ceramic composition of claim 1, wherein Si included in the sixth minor component has a content of 0.5 to 3.0 parts by mol on the basis of 100 parts by mol of the major component.

10. A dielectric material obtained by sintering the dielectric ceramic composition of claim 1.

11. A multilayer ceramic capacitor comprising:
    a ceramic body in which dielectric layers and internal electrodes are alternately stacked; and
    external electrodes provided on external surfaces of the ceramic body and electrically connected to the internal electrodes, wherein, in an XRD analysis of the dielectric layer, when a (110) peak of $BaTiO_3$ is set as 1.00, a ratio of a peak of pyrochlore ($RE_2Ti_2O_7$) at about 30.5 degrees with respect to the (110) peak of $BaTiO_3$ satisfies 0.02 or less, where RE is at least one of Y, Dy, Ho, Sm, Gd, Er, La, Ce, Nd, Tb, and Pr, and wherein the dielectric layer is formed of a dielectric ceramic composition including a major component (a barium titanate-based base material) and a minor component, and the minor component includes:

a fifth minor component including at least one selected from the group consisting of oxides and carbonates of at least one of Ba and Ca; and a sixth minor component including at least one selected from the group consisting of oxides and carbonates of Si, and glass including Si, and when a total content of the at least one of Ba and Ca included in the fifth minor component is x and a content of Si included in the sixth minor component is y, x/y satisfies 1.44 to 2.56.

12. The multilayer ceramic capacitor of claim 11, wherein the major component includes at least one selected from the group consisting of $BaTiO_3$, $(Ba_{1-x}Ca_x)(Ti_{1-y}Ca_y)O_3$ ($0 \leq x \leq 0.3$ and $0 \leq y \leq 0.1$), $(Ba_{1-x}Ca_x)(Ti_{1-y}Zr_y)O_3$ ($0 \leq x \leq 0.3$ and $0 \leq y \leq 0.5$), and $Ba(Ti_{1-y}Zr_y)O_3$ ($0 \leq y \leq 0.5$).

13. The multilayer ceramic capacitor of claim 11, wherein the minor component further includes at least one of the following components:

a first minor component including at least one selected from the group consisting of oxides and carbonates of at least one of variable-valence acceptor elements including Mn, V, Cr, Fe, Ni, Co, Cu, and Zn;

a second minor component including at least one selected from the group consisting of oxides and carbonates of a fixed-valence acceptor element including Mg;

a third minor component including at least one selected from the group consisting of oxides and carbonates of at least one of Y, Dy, Ho, Sm, Gd, Er, La, Ce, Nd, Tb, and Pr; and a fourth minor component including $CaZrO_3$.

14. The multilayer ceramic capacitor of claim 11, wherein the minor component further includes a first minor component including at least one selected from the group consisting of oxides and carbonates of at least one of variable-valence acceptor elements including Mn, V, Cr, Fe, Ni, Co, Cu, and Zn, and the at least one of variable-valence acceptor elements of Mn, V, Cr, Fe, Ni, Co, Cu, and Zn included in the first minor component has a total content of 0.2 to 2.0 parts by mol on the basis of 100 parts by mol of the major component.

15. The multilayer ceramic capacitor of claim 11, wherein the minor component further includes a second minor component including at least one selected from the group consisting of oxides and carbonates of a fixed-valence acceptor element including Mg, and the fixed-valence acceptor element including Mg included in the second minor component has a content of 0.5 parts by mol or less on the basis of 100 parts by mol of the major component.

16. The multilayer ceramic capacitor of claim 11, wherein the minor component further includes a third minor component including at least one selected from the group consisting of oxides and carbonates of at least one of Y, Dy, Ho, Sm, Gd Er, La, Ce, Nd, Tb, and Pr, and the at least one of Y, Dy, Ho, Sm, Gd, Er, La, Ce, Nd, Tb, and Pr included in the third minor component has a total content of 0.2 to 5.0 parts by mol on the basis of 100 parts by mol of the major component.

17. The multilayer ceramic capacitor of claim 11, wherein the minor component further includes a fourth minor component including $CaZrO_3$, and $CaZrO_3$ has a content of 0.25 to 5.0 parts by mol or less on the basis of 100 parts by mol of the major component.

18. The multilayer ceramic capacitor of claim 11, wherein the at least one of Ba and Ca included in the fifth minor component has a total content of 0.72 to 7.68 parts by mol on the basis of 100 parts by mol of the major component.

19. The dielectric ceramic composition of claim 11, wherein

Si included in the sixth minor component has a content of 0.5 to 3.0 parts by mol on the basis of 100 parts by mol of the major component.

* * * * *